US012774711B2

(12) United States Patent
Ueda et al.

(10) Patent No.: US 12,774,711 B2
(45) Date of Patent: Oct. 27, 2026

(54) LIQUID PRESSURE APPARATUS MONITORING SYSTEM

(71) Applicant: VALQUA, LTD., Tokyo (JP)

(72) Inventors: Akira Ueda, Gojo (JP); Akihiro Nagano, Gojo (JP)

(73) Assignee: VALQUA, LTD., Tokyo (JP)

( * ) Notice: Subject to any disclaimer, the term of this patent is extended or adjusted under 35 U.S.C. 154(b) by 261 days.

(21) Appl. No.: 18/570,383

(22) PCT Filed: Jul. 19, 2021

(86) PCT No.: PCT/JP2021/026916
§ 371 (c)(1),
(2) Date: Dec. 14, 2023

(87) PCT Pub. No.: WO2023/002519
PCT Pub. Date: Jan. 26, 2023

(65) Prior Publication Data

US 2024/0280119 A1 Aug. 22, 2024

(51) Int. Cl.
*F15B 19/00* (2006.01)
*G01M 3/26* (2006.01)

(52) U.S. Cl.
CPC ............. *F15B 19/005* (2013.01); *G01M 3/26* (2013.01)

(58) Field of Classification Search
CPC ............ F15B 19/005; F15B 2211/6306; F15B 2211/6309; F15B 2211/6313;
(Continued)

(56) References Cited

U.S. PATENT DOCUMENTS 5,586,050 A * 12/1996 Makel .................... G06Q 50/06 705/413
6,003,363 A * 12/1999 Danielson ............... G01M 3/06 73/49.3

(Continued)

FOREIGN PATENT DOCUMENTS

CN 1452701 A 10/2023
JP 2001173951 A 6/2001

(Continued)

OTHER PUBLICATIONS

Taiwanese Office Action dated Aug. 9, 2024, which issued in the corresponding Taiwanese Patent Application No. 110126738, including Eng. translation.

(Continued)

*Primary Examiner* — Tarun Sinha
(74) *Attorney, Agent, or Firm* — Dickinson Wright PLLC

(57) ABSTRACT

A liquid pressure apparatus monitoring system includes a liquid pressure apparatus, a liquid pressure sensor, a display device, a returning device, and a control device, in which the control device is configured to determine, in a first step, the state of the liquid pressure apparatus from states of normal operation, maintenance, and stop of use on the basis of a signal acquired from the liquid pressure sensor, and display, in a second step, on the display device, the state of the liquid pressure apparatus as the state of the normal operation, the maintenance, or the stop of use on the basis of a determination result of the first step.

7 Claims, 7 Drawing Sheets

(58) Field of Classification Search
CPC ........ F15B 2211/7142; F15B 2211/857; F15B 2211/87; F15B 15/1461; F15B 20/005; F15B 20/00; F15B 2211/50518; G01M 3/26
See application file for complete search history.

(56) References Cited

U.S. PATENT DOCUMENTS

| | | | | |
|---|---|---|---|---|
| 2003/0101799 | A1* | 6/2003 | Huang .................... | G01M 3/16 73/40 |
| 2004/0168435 | A1 | 9/2004 | Ichimura et al. | |
| 2011/0320140 | A1* | 12/2011 | Butler ................. | G01M 3/2807 702/45 |
| 2017/0108399 | A1 | 4/2017 | Rhee | |
| 2018/0094655 | A1* | 4/2018 | Fujiwara ............... | F15B 19/005 |
| 2018/0223880 | A1 | 8/2018 | Ooki | |
| 2018/0299339 | A1 | 10/2018 | Gouko et al. | |
| 2019/0310322 | A1 | 10/2019 | Tani et al. | |
| 2020/0291874 | A1 | 9/2020 | Masuda et al. | |
| 2020/0300277 | A1 | 9/2020 | Kikuchi et al. | |
| 2020/0347856 | A1 | 11/2020 | Takahashi | |
| 2021/0079936 | A1 | 3/2021 | Takahashi | |
| 2021/0270296 | A1 | 9/2021 | Takahashi et al. | |

FOREIGN PATENT DOCUMENTS

| | | | |
|---|---|---|---|
| JP | 2001287674 | A | 10/2001 |
| JP | 2007144580 | A | 6/2007 |
| JP | 2010164127 | A | 7/2010 |
| JP | 2013167622 | A | 8/2013 |
| JP | 2014220393 | A | 11/2014 |
| JP | 2016045068 | A | 4/2016 |
| JP | 2016070407 | A | 5/2016 |
| JP | 2017072578 | A | 4/2017 |
| JP | 2017089668 | A | 5/2017 |
| JP | 2017-517703 | A | 6/2017 |
| JP | 2018054021 | A | 4/2018 |
| JP | 2018059548 | A | 4/2018 |
| JP | 2019132292 | A | 8/2019 |
| JP | 2019132293 | A | 8/2019 |
| JP | 2019-157844 | A | 9/2019 |
| JP | 2019-187055 | A | 10/2019 |
| JP | 2019194484 | A | 11/2019 |
| JP | 2020026845 | A | 2/2020 |
| JP | 2021032287 | A | 3/2021 |

OTHER PUBLICATIONS

Japanese Office Action dated Mar. 12, 2024, which issued in the corresponding Japanese Patent Application No. 2020-078824, including Eng. translation.
Japanese Office Action dated Nov. 14, 2023, which issued in the corresponding Japanese Patent Application No. 2020-078824, including Eng. translation.
International Search Report dated Sep. 28, 2021, which issued in the corresponding PCT Patent Application No. PCT/JP2021/026916, including Eng. translation.

* cited by examiner

FIG.4

| SUPPORT INFORMATION | | | |
|---|---|---|---|
| STATE OF CYLINDER | LED | LIQUID CRYSTAL | BUZZER |
| NORMAL OPERATION | BLUE | SAFETY | SILENCE |
| MAINTENANCE | YELLOW | EXCHANGE | INTERMITTENT SOUND |
| STOP OF USE | RED | DANGER | CONTINUOUS SOUND |

LIQUID PRESSURE APPARATUS MONITORING SYSTEM

TECHNICAL FIELD

The present invention relates to a liquid pressure apparatus monitoring system that monitors a state of a liquid pressure apparatus.

BACKGROUND ART

For example, Japanese Patent Laying-Open No. 2019-194484 (PTL 1), Japanese Patent Laying-Open No. 2018-054021 (PTL 2), Japanese Patent Laying-Open No. 2017-089668 (PTL 3), and Japanese Patent Laying-Open No. 2016-045068 (PTL 4) disclose techniques for detecting liquid leakage in a liquid pressure apparatus.

CITATION LIST

Patent Literatures

PTL 1: Japanese Patent Laying-Open No. 2019-194484
PTL 2: Japanese Patent Laying-Open No. 2018-054021
PTL 3: Japanese Patent Laying-Open No. 2017-089668
PTL 4: Japanese Patent Laying-Open No. 2016-045068

SUMMARY OF INVENTION

Technical Problem

The technique disclosed in each of the above PTLs allows detection of liquid leakage, but does not disclose any system that notifies a state leading to liquid leakage.

An object of the present invention is to solve the above problem, and to provide a liquid pressure apparatus monitoring system capable of confirming a time of maintenance of a sealing material more accurately and preventing occurrence of liquid leakage.

Solution to Problem

A liquid pressure apparatus monitoring system of the present invention includes a liquid pressure apparatus, a liquid pressure sensor that monitors a liquid pressure inside the liquid pressure apparatus, a display device that displays a state of the liquid pressure apparatus, a returning device that returns a state of the display device to an initial state, and a control device, in which the control device is configured to determine, in a first step, the state of the liquid pressure apparatus from states of normal operation, maintenance, and stop of use on the basis of a signal acquired from the liquid pressure sensor, and display, in a second step, on the display device, the state of the liquid pressure apparatus as the state of the normal operation, the maintenance, and the stop of use on the basis of a determination result of the first step.

In another aspect, the display device includes a normal operation lighting portion, a maintenance lighting portion, and a use stop lighting portion, and the control device turns on any of the normal operation lighting portion, the maintenance lighting portion, and the use stop lighting portion on the basis of a determination in the second step.

In another aspect, the display device includes a liquid crystal display, and the control device displays, on the liquid crystal display, a start time of the normal operation, a start date and time of transition to the maintenance, and a start date and time of transition to the stop of use.

In another embodiment, a sound generator is further provided, and the control device activates the sound generator when the state is determined as the maintenance in the second step of the control device.

In another embodiment, the control device activates the sound generator when the state is determined as the stop of use in the second step of the control device.

In another aspect, the control device varies a tone generated when the sound generator is activated between a case where the state is determined as the maintenance and a case where the state is determined as the stop of use.

An another aspect further includes a plurality of the liquid pressure apparatuses each including the liquid pressure sensor, in which the control device executes the first step and the second step corresponding to each of the liquid pressure apparatuses on the basis of a signal acquired from the plurality of liquid pressure sensors.

In another embodiment, a signal is transmitted between the liquid pressure sensor and the control device in a wired manner or a wireless manner.

In another aspect, an operation panel is provided outside, and a signal is transmitted between the operation panel and the control device in the wired manner or the wireless manner.

Advantageous Effects of Invention

This liquid pressure apparatus monitoring system makes it possible to provide a liquid pressure apparatus monitoring system that confirms a time of maintenance of a sealing material more accurately and prevents occurrence of liquid leakage.

BRIEF DESCRIPTION OF DRAWINGS

FIG. 4 is a diagram illustrating an operation content of the liquid pressure apparatus monitoring system according to the embodiment.

DESCRIPTION OF EMBODIMENTS

A liquid pressure apparatus monitoring system according to the present embodiment will be described below with reference to the drawings. In the embodiments described below, when the number, amount, and the like are referred to, the scope of the present invention is not necessarily limited to the number, amount, and the like unless otherwise specified. In addition, the same components and equivalent components are denoted by the same reference signs, and redundant description may not be repeated. The seal structure described below is an example, and the liquid leakage detection unit and the liquid pressure apparatus monitoring system described below can be applied to various seal structures.

(Liquid Leakage Detection Unit 100)

Figure 1:
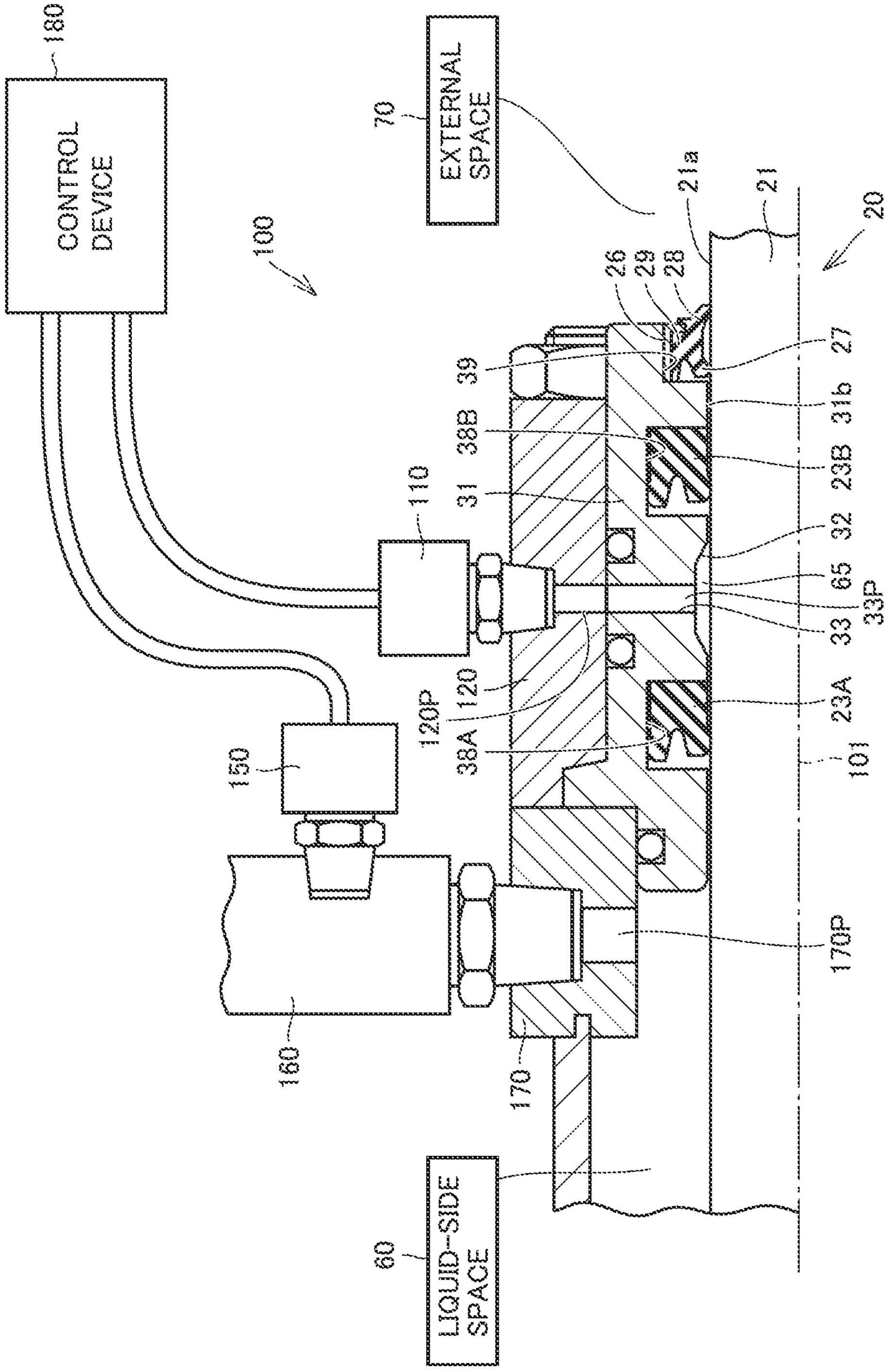
FIG. 1 is a sectional view illustrating a state in which a configuration of a liquid leakage detection unit adopted in a liquid pressure apparatus monitoring system according to an embodiment is assembled to a shaft.

Referring to FIG. 1, a configuration of a liquid leakage detection unit 100 will be described. FIG. 1 is a sectional view illustrating a state in which liquid leakage detection unit 100 is assembled to a shaft in a case where a liquid pressure sensor according to the present embodiment is used.

Referring to FIG. 1, liquid leakage detection unit 100 is an assembly unit assembled to a shaft 21 of a hydraulic cylinder 20. Shaft 21 has a shape extending axially along a central axis 101. Shaft 21 is a movable shaft. In the present embodiment, it is assumed that shaft 21 is a shaft of hydraulic cylinder 20. Shaft 21 reciprocates in an axial direction of central axis 101.

A housing 31 is provided on an outer periphery of shaft 21. Housing 31 has a shape extending in a cylindrical shape in the axial direction of central axis 101.

A liquid-side space 60 is defined on the outer periphery of shaft 21. Liquid-side space 60 is filled with oil. Liquid-side space 60 is provided as a hydraulic chamber to which oil for operating shaft 21 is supplied. Liquid-side space 60 is provided on one side of housing 31 in the axial direction of central axis 101. An external space 70 is defined on the other side of housing 31 in the axial direction of central axis 101.

Liquid leakage detection unit 100 includes a first rod seal 23A as a primary seal, a second rod seal 23B as a secondary seal, and an irregular-shaped dust seal 26 as a tertiary seal.

First rod seal 23A, second rod seal 23B, and irregular-shaped dust seal 26 are closed annular sealing materials. First rod seal 23A, second rod seal 23B, and irregular-shaped dust seal 26 include an elastic member such as rubber. First rod seal 23A, second rod seal 23B, and irregular-shaped dust seal 26 are provided on an outer peripheral surface 21*a* of shaft 21.

First rod seal 23A, second rod seal 23B, and the irregular-shaped dust seal 26 are provided at a distance in the axial direction of central axis 101. In the axial direction of central axis 101, first rod seal 23A is provided closer to liquid-side space 60, and irregular-shaped dust seal 26 is provided closer to external space 70. Second rod seal 23B is disposed between first rod seal 23A and irregular-shaped dust seal 26.

In housing 31, a first seal groove 38A, a second seal groove 38B, and a third seal groove 39 are formed. First seal groove 38A, second seal groove 38B, and third seal groove 39 have a groove shape that is recessed from an inner peripheral surface 31*b* of housing 31 and revolves around central axis 101. First seal groove 38A and second seal groove 38B have rectangular cross sections. Third seal groove 39 has a rectangular cross section opened to external space 70 in the axial direction of central axis 101.

First rod seal 23A is accommodated in first seal groove 38A, second rod seal 23B is accommodated in second seal groove 38B, and irregular-shaped dust seal 26 is accommodated in third seal groove 39. On the outer periphery of shaft 21, an inter-seal space 65 is defined between first rod seal 23A and second rod seal 23B.

First rod seal 23A has a sealing function of sealing the oil disposed in liquid-side space 60.

Irregular-shaped dust seal 26 has, as constituent parts thereof, a lip 27 (first lip), a lip 28 (second lip), and a base 29. Base 29 is installed in third seal groove 39. Lip 27 and lip 28 extend from base 29 toward shaft 21 and contact outer peripheral surface 21*a* of shaft 21. In the axial direction of central axis 101, lip 27 is provided closer to inter-seal space 65, and lip 28 is provided closer to external space 70.

Second rod seal 23B has a function of sealing the oil that has entered inter-seal space 65 from liquid-side space 60 within inter-seal space 65 when the oil leaks from first rod seal 23A. Irregular-shaped dust seal 26 has a function of preventing dust from entering inter-seal space 65 from external space 70 by lip 28.

In the present embodiment, a sealing material configuration that separates second rod seal 23B having a function of sealing oil and irregular-shaped dust seal 26 having a function of preventing entry of dust is adopted. However, a configuration in which second rod seal 23B and irregular-shaped dust seal 26 are used as one sealing member can also be adopted.

A recess 32 and a through hole 33 are formed in housing 31. Recess 32 and through hole 33 are defined between first rod seal 23A and second rod seal 23B in the axial direction of central axis 101. Recess 32 is recessed from inner peripheral surface 31*b* of housing 31 and has a shape that revolves around central axis 101. Through hole 33 functions as a sensing port 33P.

A first block 120 is connected to housing 31. First block 120 is provided with a hole 120P communicating with through hole 33 of housing 31. In an outlet region of hole 120P, a first liquid pressure sensor 110 as a first liquid information acquisition device that acquires liquid information of a liquid located in inter-seal space 65 through sensing port 33P is provided. A liquid pressure of the liquid located in inter-seal space 65 measured by first liquid pressure sensor 110 is sent to a control device 180.

A second block 170 is connected to liquid-side space 60 of housing 31. Second block 170 is provided with an application port 170P communicating with liquid-side space 60. A hydraulic pressure application device 160 and a second liquid pressure sensor 150 as a second liquid information acquisition device that obtains liquid information of a liquid located in liquid-side space 60 are connected to application port 170P. A liquid pressure of the liquid located in liquid-side space 60 measured by second liquid pressure sensor 150 is sent to control device 180.

In liquid leakage detection unit 100 having the above configuration, the liquid pressure of the liquid in each space measured by first liquid pressure sensor 110 and second liquid pressure sensor 150 is analyzed by control device 180. On the basis of the analysis result, a sealed state of shaft 21 of hydraulic cylinder 20 provided with liquid leakage detection unit 100 is determined to be any one state of "normal operation", "maintenance", or "stop of use". In the determination, calculation is performed on the basis of a total use time of seal, a liquid pressure applied to the seal, the number of times of detection, and the liquid pressure of the liquid in the space.

The contents of the alert indicate a replacement level in the order of "SAFETY "normal operation""<"EXCHANGE "maintenance""<"DANGER "stop of use"". "SAFETY "normal operation"" refers to a state in which the sealing material can be used securely and safely.

"EXCHANGE "maintenance"" means that the sealing material can be continuously used but is in a state where maintenance should be executed from a start of maintenance preparation. "DANGER "stop of use"" means a state in which the device should be promptly stopped and maintenance should be executed.

(Liquid Pressure Apparatus Monitoring System 1000)

Figure 2:
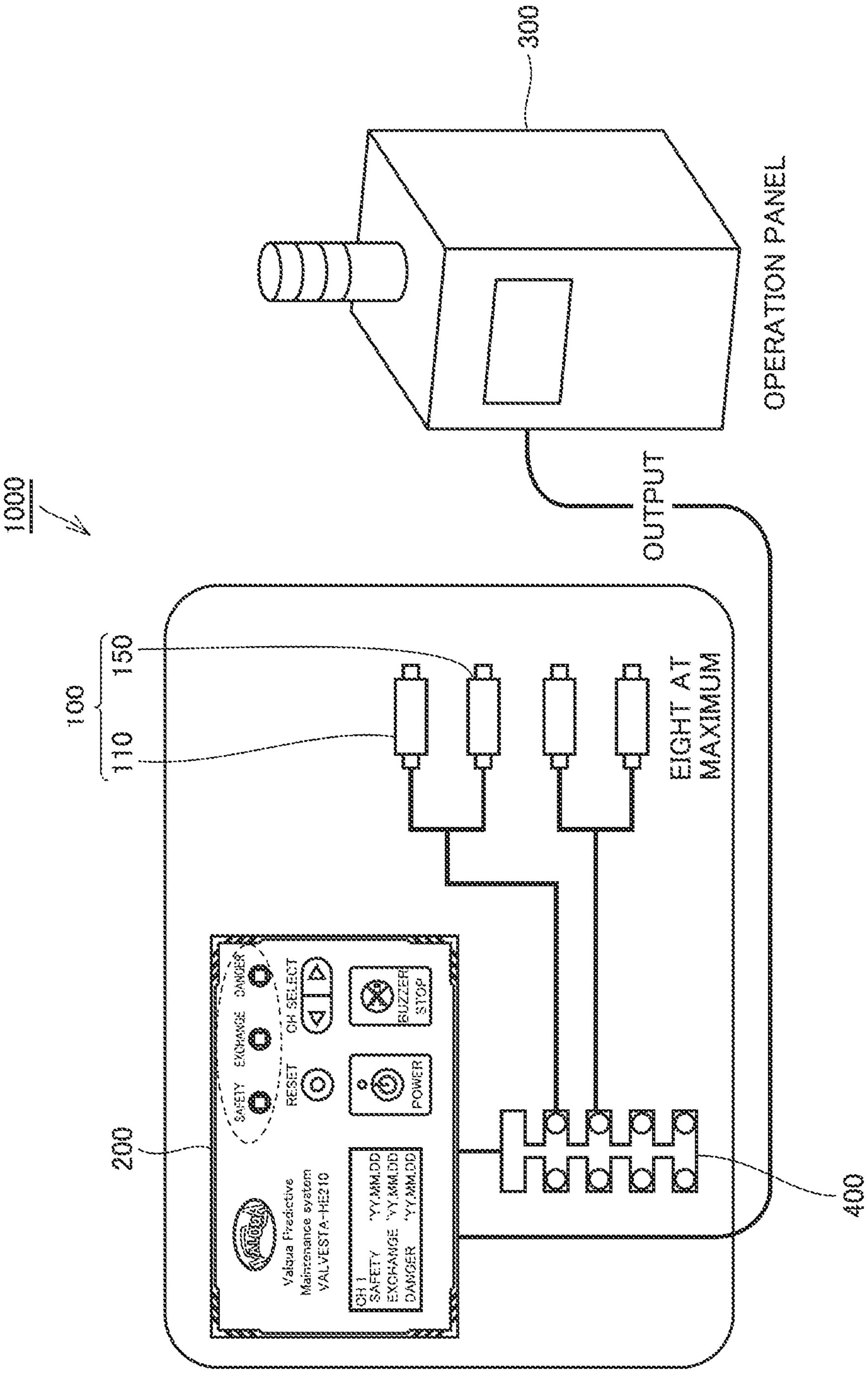
FIG. 2 is a diagram illustrating a schematic configuration of the liquid pressure apparatus monitoring system according to the embodiment.
Figure 3:
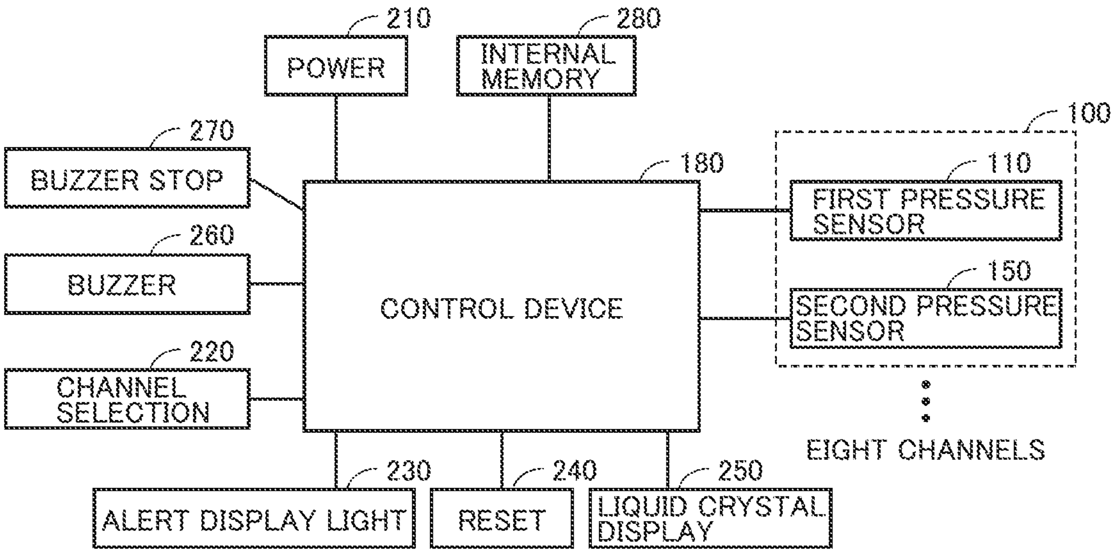
FIG. 3 is a configuration diagram of the liquid pressure apparatus monitoring system according to the embodiment.
Figure 5:
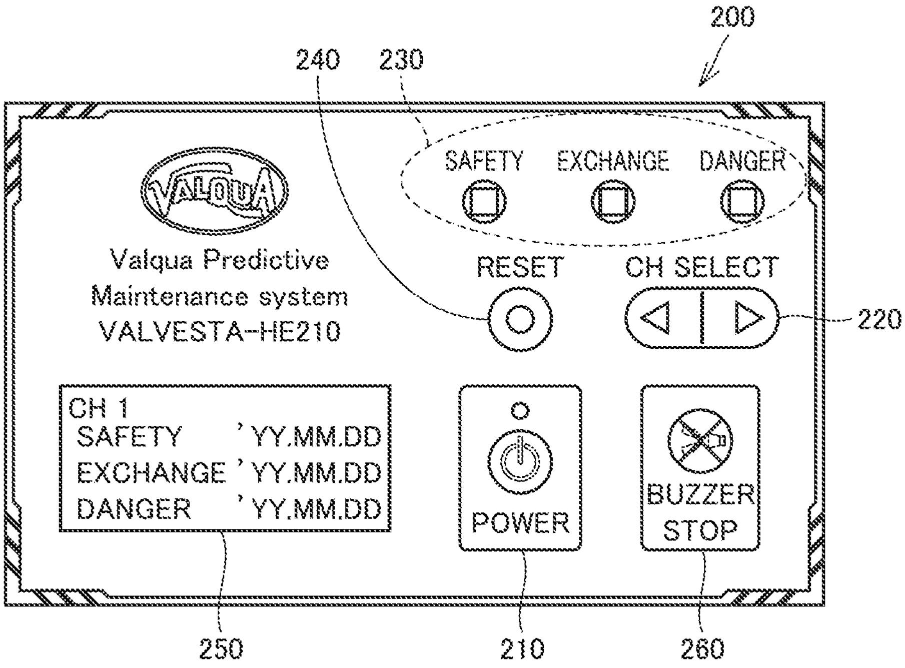
FIG. 5 is a diagram illustrating a display provided in a system body of the liquid pressure apparatus monitoring system according to the embodiment.

Next, referring to FIGS. 2 to 4, a liquid pressure apparatus monitoring system 1000 will be described. FIG. 2 is a diagram illustrating a schematic configuration of liquid pressure apparatus monitoring system 1000, FIG. 3 is a configuration diagram of liquid pressure apparatus monitoring system 1000, and FIG. 4 is a diagram illustrating an operation content of the liquid pressure apparatus monitoring system.

Liquid pressure apparatus monitoring system 1000 can include one channel or two or more channels of liquid leakage detection unit 100. In the present embodiment, it is assumed that eight channels (eight liquid leakage detection units 100) can be monitored, but the number of channels can be changed as appropriate.

Liquid pressure apparatus monitoring system 1000 includes eight liquid leakage detection units 100, a system body 200, and a terminal 400. Terminal 400 is externally attached in order to miniaturize a casing of system body 200. Terminal 400 may be accommodated in the casing of system body 200 as long as an external capacity of the casing does not cause a problem.

System body 200 includes control device 180, a power button 210, a channel selection button 220, an alert display light 230, a reset button (return button) 240, a liquid crystal display 250, a buzzer 260, a buzzer stop button 270, and an internal memory 280.

A signal from first liquid pressure sensor 110 and second liquid pressure sensor 150 of each of eight liquid leakage detection units 100 is input to control device 180 via terminal 400. Control device 180 monitors the liquid pressure apparatus of each channel on the basis of the input signal.

Specifically, as described above, the liquid pressure of the liquid in each space measured by first liquid pressure sensor 110 and second liquid pressure sensor 150 and the number of times of detection are analyzed in control device 180. On the basis of the analysis result, control device 180 determines that the sealed state of shaft 21 on which liquid leakage detection unit 100 is provided is any one state of "normal operation", "maintenance", or "stop of use" in each channel.

As described above, control device 180 individually monitors the plurality of liquid leakage detection units 100. Control device 180 transmits an alert corresponding to each channel in stages. The contents of the alert are transmitted by a change in alert display light 230 as a display device (green⇒yellow⇒red), the contents displayed on liquid crystal display 250 (status or log of a state change), and buzzer 260 as a sound generator (silence⇒intermittent sound⇒continuous sound).

As illustrated in FIG. 4, as the operation content by control device 180, when hydraulic cylinder 20 is in the state of "normal operation", alert display light 230 displays blue (normal operation lighting portion), liquid crystal display 250 displays "SAFETY", and buzzer 260 is silent. When hydraulic cylinder 20 is in the state of "maintenance", alert display light 230 displays yellow (maintenance lighting portion), liquid crystal display 250 displays "EXCHANGE", and buzzer 260 emits intermittent sound. When hydraulic cylinder 20 is in the state of "stop of use", alert display light 230 displays red (use stop lighting portion), liquid crystal display 250 displays "DANGER", and buzzer 260 emits continuous sound.

A tone generated when buzzer 260 is activated is varied between a case where the state is determined as the state of maintenance and a case where the state is determined as the state of stop of use so that a monitoring person can easily recognize the state of the channel. At the time of sounding the buzzer, the monitoring person can mute the sound by operating the buzzer stop button.

In addition to system body 200, remote monitoring and reception of alert is possible by connection to an operation panel 300 outside system body 200 or a device monitoring room (not shown).

<Operation of System Body 200>

First, the monitoring person turns on power by power button 210. Accordingly, control device 180 starts monitoring. When a signal is received from a channel connected to control device 180, a status is displayed. In addition, an alert is transmitted as necessary.

Specifically, control device 180 determines a state of the liquid pressure apparatus of the corresponding channel from states of the normal operation, the maintenance, and the stop of use on the basis of the signals acquired from first liquid pressure sensor 110 and second liquid pressure sensor 150 (first step). Thereafter, on the basis of the determination result of the first step, the state of the liquid pressure apparatus of the corresponding channel is displayed on alert display light 230 and liquid crystal display 250 which are display devices as the state of the normal operation, the maintenance, or the stop of use (second step). The channel of liquid crystal display 250 is switched by channel selection button 220.

Liquid crystal display 250 displays, for each channel, a start date of normal operation, a start date and time of transition to maintenance, and a start date and time of transition to stop of use. The status of a channel that is not connected or a channel that has no signal due to failure or disconnection is not displayed.

When an alert state ("maintenance" or "stop of use") appears, the display shows an indication to jump to a target channel regardless of a display channel of liquid crystal display 250. After the maintenance is executed, the target channel is displayed on liquid crystal display 250. Thereafter, reset button 240 is held down to return to an initial state and start monitoring.

A log (event record data) when the alert state appears is to be saved in internal memory 280. As a result, it is possible to extract the record data saved in internal memory 280 by external access and perform diagnosis. Software of the system body can be updated by external access.

Other Embodiments

Figure 6:
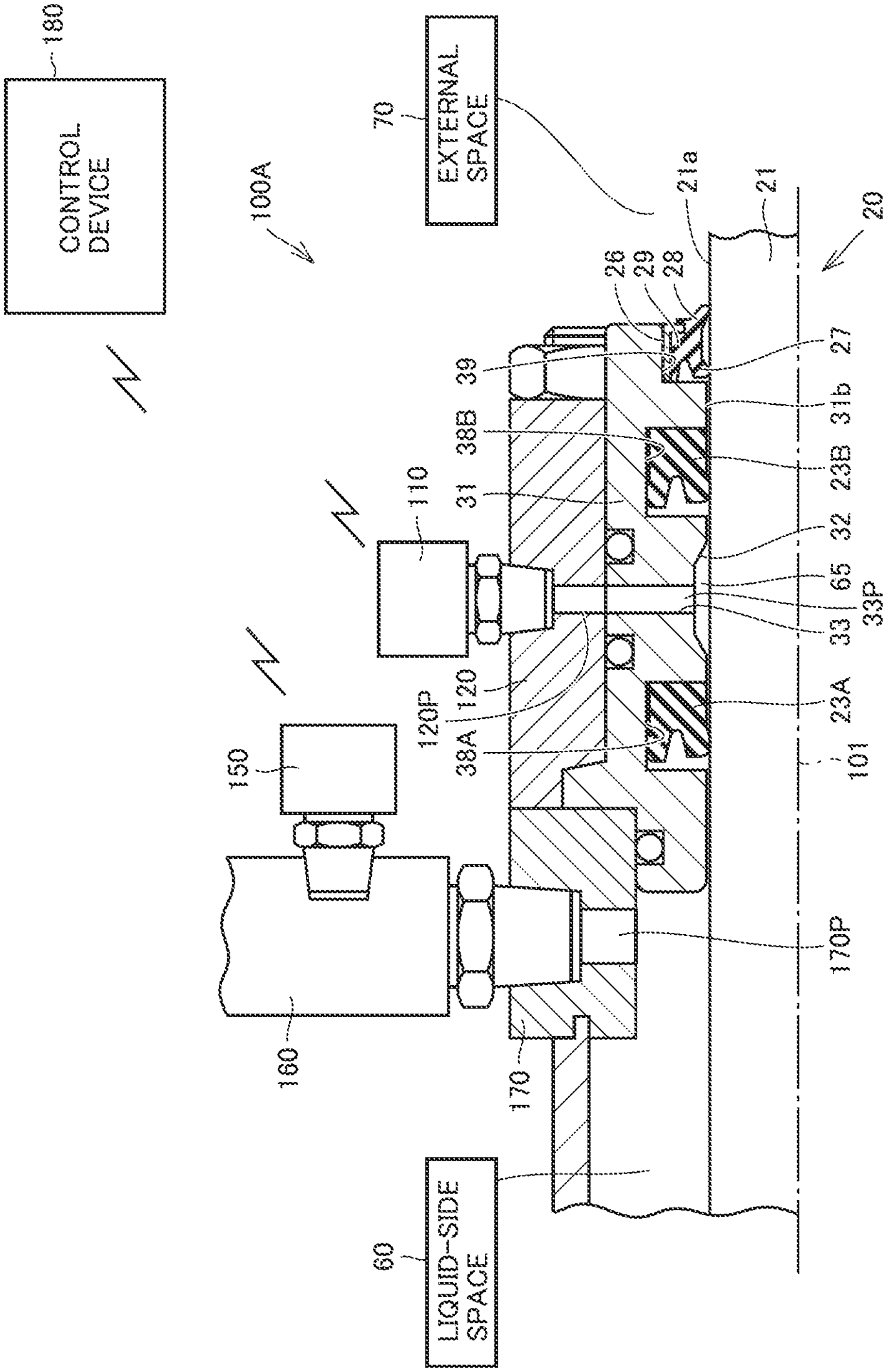
FIG. 6 is a sectional view illustrating a state in which a configuration of a liquid leakage detection unit adopted in a liquid pressure apparatus monitoring system according to another embodiment is assembled to a shaft.
Figure 7:
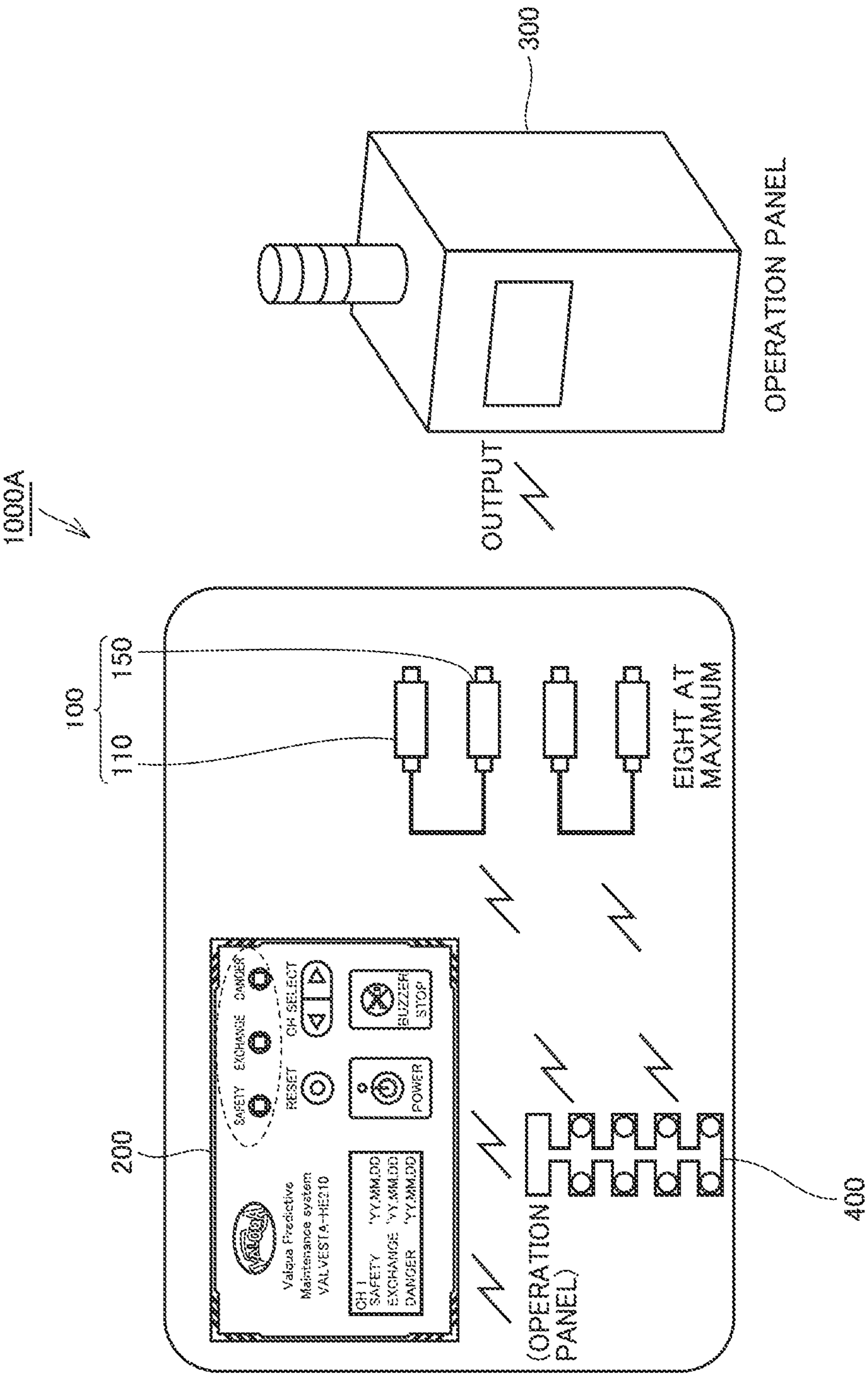
FIG. 7 is a diagram illustrating a schematic configuration of the liquid pressure apparatus monitoring system according to another embodiment.

Referring to FIGS. 6 and 7, a liquid pressure apparatus monitoring system 1000 according to another embodiment will be described. FIG. 6 is a sectional view illustrating a state in which a configuration of liquid leakage detection unit 100 adopted in liquid pressure apparatus monitoring system 1000A according to another embodiment is assembled to a shaft, and FIG. 7 is a diagram illustrating a schematic configuration of liquid pressure apparatus monitoring system 1000A.

In liquid leakage detection unit 100 described above, signals are transmitted between first liquid pressure sensor 110 and control device 180 and between second liquid pressure sensor 150 and control device 180 in a wired manner. In a case where operation panel 300 is provided, a signal is also transmitted between operation panel 300 and control device 180 in the wired manner. On the other hand, in liquid leakage detection unit 100A, a wireless manner is used.

As a wireless communication means, for example, any one of Bluetooth (registered trademark), Zigbee (registered trademark), or wireless LAN may be applied.

Specifically, first liquid pressure sensor 110, second liquid pressure sensor 150, and the control device 180 that processes measurement data acquired from first liquid pressure sensor 110 and second liquid pressure sensor 150 are connected to be bidirectionally communicable by a wireless communication means, measurement is performed by first liquid pressure sensor 110 and second liquid pressure sensor 150 on the basis of a measurement start signal from control device 180, and the measurement data are sequentially collected by control device 180.

There is a plurality of wireless networks constructed by control device 180, a plurality of first liquid pressure sensors 110, and a plurality of second liquid pressure sensors 150, and one control device 180 corresponds to each wireless network.

Control device 180 includes a unit number setting function for setting a predetermined unit number for each first liquid pressure sensor 110 and each second liquid pressure sensor 150 and a unit setting file when specifying each first liquid pressure sensor 110 and each second liquid pressure sensor 150 and perform communication.

Control device 180 acquires unique identifiers assigned in advance to first liquid pressure sensor 110 and second liquid pressure sensor 150 for each communication area that a radio wave of wireless communication reaches from first liquid pressure sensor 110 and second liquid pressure sensor 150 existing in the wireless network constructed in the communication area, sets a predetermined unit number for each first liquid pressure sensor 110 and each second liquid pressure sensor 150 for which the identifier is acquired by the unit number setting function, and saves the set unit number and identifier in association with each other in the unit setting file. Thereafter, the unit setting file is read for each communication area, and the unit number is designated to communicate with first liquid pressure sensor 110 and second liquid pressure sensor 150.

In a case where operation panel 300 is further provided, transmission of a signal between operation panel 300 and control device 180 is also connected to be bidirectionally communicable by a wireless communication means.

As described above, liquid pressure apparatus monitoring systems 1000 and 1000A according to the present embodiment make it possible to confirm a timing of maintenance of the sealing material more accurately and prevent occurrence of liquid leakage.

It should be understood that the embodiments disclosed herein are illustrative in all respects and not restrictive. The scope of the present invention is defined by not the description above, but the claims, and it is intended that all modifications within the meaning and scope equivalent to the claims are included in the present invention.

REFERENCE SIGNS LIST

20: hydraulic cylinder, 21: shaft, 21*a*: outer peripheral surface, 23A: first rod seal, 23B: second rod seal, 26: irregular-shaped dust seal, 27, 28: lip, 29: base, 31: housing, 31*b*: inner peripheral surface, 32: recess, 33: through hole, 33P: sensing port, 38A: first seal groove, 38B: second seal groove, 39: third seal groove, 60: liquid-side space, 65: inter-seal space, 70: external space, 100, 100A: liquid leakage detection unit, 101: central axis, 110: first liquid pressure sensor, 120: first block, 120P: hole, 150: second liquid pressure sensor, 160: hydraulic pressure application device, 170: second block, 170P: application port, 180: control device, 200: system body, 210: power button, 220: channel selection button, 230: alert display light, 240: reset button, 250: liquid crystal display, 260: buzzer, 270: buzzer stop button, 280: internal memory, 300: operation panel, 400: terminal, 1000, 1000A: liquid pressure apparatus monitoring system

The invention claimed is:

1. A liquid pressure apparatus monitoring system comprising:

a liquid pressure apparatus having a hydraulic chamber inside;

a first seal and a second seal provided inside the hydraulic chamber with an inter-seal space defined between them a liquid pressure sensor that monitors a liquid pressure inside the liquid pressure apparatus;

the liquid pressure sensor monitors the hydraulic pressure in the inter-seal space and the hydraulic pressure in the hydraulic chamber;

a display device that displays a state of the liquid pressure apparatus;

a returning device that returns a state of the display device to an initial state; and a control device, wherein the control device is configured to determine, in a first step, the state of the liquid pressure apparatus from states of normal operation, maintenance, and stop of use on a basis of a signal acquired from the liquid pressure sensor, and display, in a second step, on the display device, the state of the liquid pressure apparatus as the state of the normal operation, the maintenance, and the stop of use on a basis of a determination result of the first step;

wherein the display device includes a normal operation lighting portion, a maintenance lighting portion, and a use stop lighting portion, and the control device turns on any of the normal operation lighting portion, the maintenance lighting portion, and the use stop lighting portion on a basis of a determination in the second step; and wherein the display device includes a liquid crystal display, and the control device displays, on the liquid crystal display, a start date of the normal operation, a start date and time of transition to the maintenance, and a start date and time of transition to the stop of use.

2. The liquid pressure apparatus monitoring system according to claim 1, further comprising a sound generator, wherein the control device activates the sound generator when the state is determined as the maintenance in the second step of the control device.

3. The liquid pressure apparatus monitoring system according to claim 2, wherein the control device activates the sound generator when the state is determined as the stop of use in the second step of the control device.

4. The liquid pressure apparatus monitoring system according to claim 3, wherein the control device varies a tone generated when the sound generator is activated between a case where the state is determined as the maintenance and a case where the state is determined as the stop of use.

5. The liquid pressure apparatus monitoring system according to claim 1, further comprising a plurality of the liquid pressure apparatuses each including the liquid pressure sensor, wherein the control device executes the first step and the second step corresponding to each of the liquid pressure apparatuses on a basis of a signal acquired from the plurality of liquid pressure sensors.

6. The liquid pressure apparatus monitoring system according to claim 1, wherein a signal is transmitted between the liquid pressure sensor and the control device in a wired manner or a wireless manner.

7. The liquid pressure apparatus monitoring system according to claim 1, wherein an operation panel is provided outside, and a signal is transmitted between the operation panel and the control device in the wired manner or the wireless manner.

* * * * *